(12) United States Patent
Sandhu

(10) Patent No.: US 7,539,270 B2
(45) Date of Patent: May 26, 2009

(54) METHOD AND APPARATUS TO INTERLEAVE BITS ACROSS SYMBOLS FROM DIFFERENT CONSTELLATIONS

(75) Inventor: Sumeet Sandhu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 727 days.

(21) Appl. No.: 10/954,618

(22) Filed: Sep. 30, 2004

(65) Prior Publication Data

US 2006/0067411 A1    Mar. 30, 2006

(51) Int. Cl.
*H04L 27/36* (2006.01)
(52) U.S. Cl. .......................... 375/298; 375/261; 455/60
(58) Field of Classification Search ................ 375/298; 370/206; 455/60
See application file for complete search history.

(56) References Cited

U.S. PATENT DOCUMENTS

| | | | |
|---|---|---|---|
| 6,282,168 B1* | 8/2001 | Vijayan et al. | 370/203 |
| 6,546,557 B1* | 4/2003 | Ovadia | 725/129 |
| 7,170,849 B1* | 1/2007 | Arivoli et al. | 370/208 |
| 7,313,190 B2* | 12/2007 | Balakrishnan et al. | 375/260 |
| 2003/0105996 A1* | 6/2003 | Dagan et al. | 714/701 |
| 2004/0081073 A1* | 4/2004 | Walton et al. | 370/204 |
| 2004/0202255 A1* | 10/2004 | Dallal | 375/267 |
| 2004/0258025 A1* | 12/2004 | Li et al. | 370/334 |

OTHER PUBLICATIONS

Zhang, "Turbo decoding with erasures for high-speed transmission in the presence of impulse noise", 2002 International Zurich Seminar on Broadband Communications, 2002, Access, Transmission, Networking, Publication Date: 2002, On pp. 20-1-20-6, Meeting date: Feb. 19, 2002 - Feb. 21, 2002, Location: Zurich, Switzerland.*
Toptchiyski, "A double byte interleaving scheme for ADSL modems" IEEE Communications Letters, vol. 5, Issue 3, Mar. 2001 pp. 110-112.*
Ovadia, "The effect of interleaver depth and QAM channel frequency offset on the performance of multichannel AM-VSB/256-QAM video lightwave transmission systems", IEEE Photonics Technology Letters, vol. 10, Issue 8, Aug. 1998 pp. 1174-1176.*
Toumpakaris, "A byte-erasure method for improved impulse immunity in DSL systems using soft information from an inner code", IEEE International Conference on Communications, 2003, ICC '03, vol. 4, 11-15 May 2003 pp. 2431-2435 vol. 4.*

* cited by examiner

*Primary Examiner*—Juan A Torres
(74) *Attorney, Agent, or Firm*—The Law Offices of John C. Scott, LLC; John C. Scott

(57) ABSTRACT

An encoded input bit stream is interleaved across a number of symbols having different bit sizes in a manner that ensures that the bits assigned to each symbol from the bit stream are separated by a minimum separation. In this manner, bits that are adjacent within the bit stream do not get assigned to the same symbol.

26 Claims, 3 Drawing Sheets

US 7,539,270 B2

METHOD AND APPARATUS TO INTERLEAVE BITS ACROSS SYMBOLS FROM DIFFERENT CONSTELLATIONS

TECHNICAL FIELD

The invention relates generally to digital communications and, more particularly, to bit interleaving techniques for use in digital systems.

DETAILED DESCRIPTION

Figure 1:
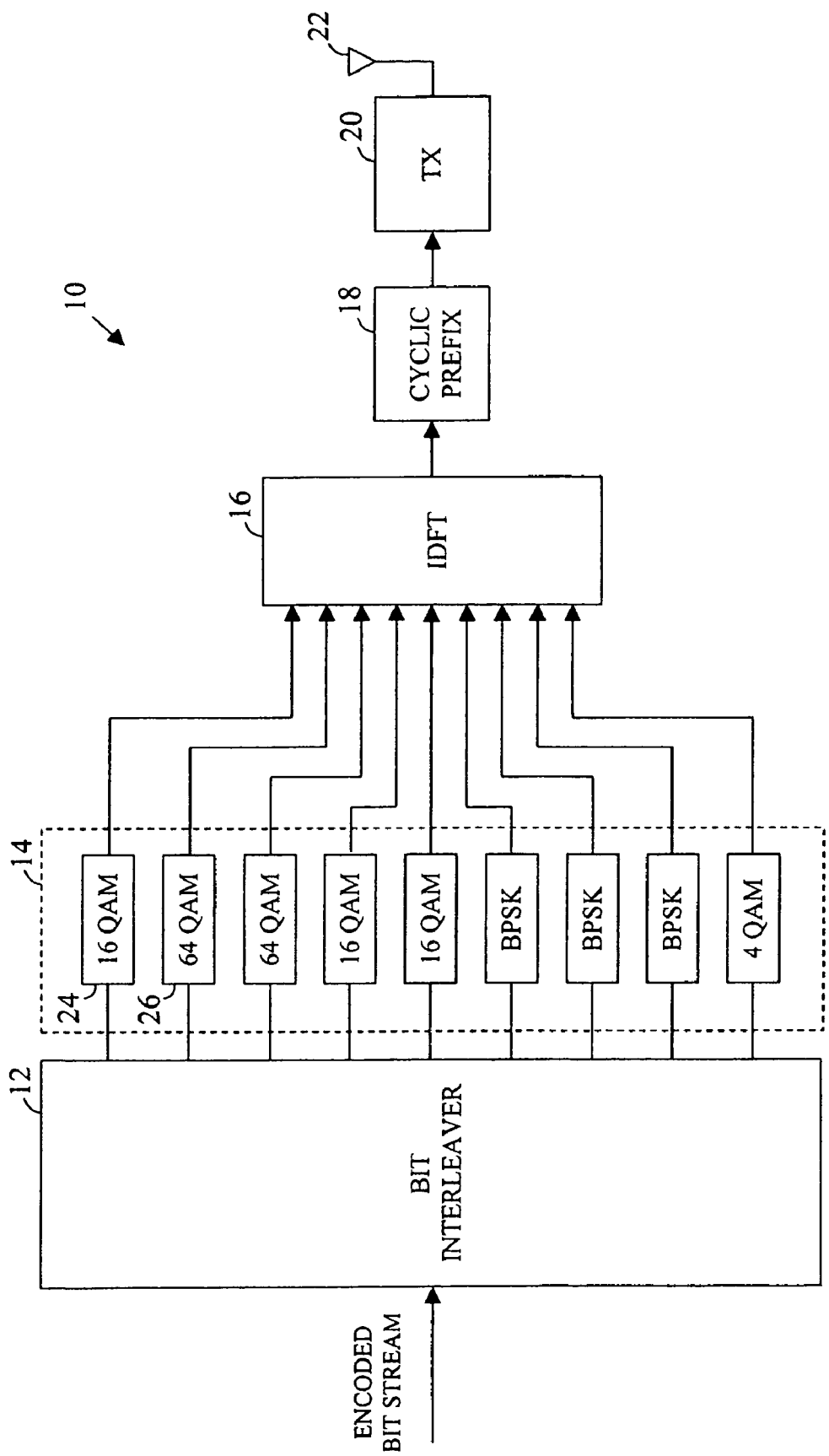
FIG. 1 is a block diagram illustrating an example OFDM transmitter arrangement in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In digital systems, applications exist that require the bits of an input bit stream to be distributed among a number of output symbols having varying bit lengths. One such application, for example, is within an orthogonal frequency division multiplexing (OFDM) transmitter that is using adaptive bit loading techniques to achieve enhanced performance through a corresponding channel. In such an application, each of the subcarriers of a signal to be transmitted may utilize a different modulation constellation based on, for example, channel gains associated with the various subcarriers. Thus, higher quality subcarrier channels may utilize modulation constellations that map symbols having a higher bit count and lower quality subcarrier channels may utilize modulation constellations that map symbols having a lower bit count. An input bit stream in such an OFDM transmitter needs to be distributed among the various symbols associated with the different subcarriers. To improve performance and increase robustness of operation in a communication system, it is often desirable that a high degree of separation be maintained within a transmitted signal between bits that are proximately located within the input bit stream. Thus, strategies that merely "fill up" each of the modulation symbols one after another using the input bit stream may result in poor performance. Similarly, strategies that distribute bits in an input bit stream to modulation symbols one bit at a time to each successive symbol may also result in poor performance. In at least one aspect of the present invention, techniques and structures are provided for interleaving bits across symbols from different constellations in a manner that can achieve a high degree of separation between related bits. The inventive techniques and structures may be used within OFDM systems, as described above, and in many other applications.

FIG. 1 is a block diagram illustrating an example OFDM transmitter arrangement 10 in accordance with an embodiment of the present invention. As illustrated, the OFDM transmitter arrangement 10 may include one or more of: a bit interleaver 12, a plurality of digital modulators 14, an inverse discrete Fourier transform unit 16, a cyclic prefix unit 18, and a wireless transmitter 20. The wireless transmitter 20 may be coupled to one or more antennas 22 to facilitate the transmission of signals into an external wireless channel. Any type of antenna(s) may be used including, for example, a dipole, a patch, a helical antenna, an antenna array, and/or others, including combinations of the above. The bit interleaver 12 is operative for distributing a plurality of input bits (e.g., within an encoded input bit stream) to the various modulators of the plurality of digital modulators 14. Each of the modulators takes the bits that are distributed to it and maps the bits based on a corresponding modulation constellation to generate a modulation symbol for a corresponding subcarrier of an OFDM symbol to be transmitted by the transmitter arrangement 10. The outputs of the modulators may be delivered to corresponding inputs of the IDFT unit 16 which converts the modulation symbols from a frequency domain representation to a time domain representation. Any type of IDFT may be used (e.g., an inverse fast Fourier transform (IFFT), etc.). The cyclic prefix unit 18 adds a cyclic prefix to the time domain output of the IDFT 16 to form an OFDM symbol. As is well known in the art, a cyclic prefix may be added to the time domain signal to reduce the occurrence of inter-symbol interference (ISI) and inter-carrier interference (ICI) in the system. The transmitter 20 may, among other things, up-convert and amplify the OFDM symbol and transmit it from the antenna(s) 22.

As illustrated in FIG. 1, the modulators within the plurality of digital modulators 14 may use different modulation schemes from one another. For example, as shown, a first modulator 24 may use 16 quadrature amplitude modulation (16-QAM), a second modulator 26 may use 64-QAM, and so on. In addition, the modulation scheme used by each of the modulators may vary with time based on, for example, current conditions in the wireless channel. Thus, if the channel conditions are favorable for a particular subcarrier, a modulation scheme may be used for that subcarrier that involves a higher number of bits (e.g., 64 QAM) and, if the channel conditions are unfavorable for another subcarrier, a modulation scheme may be used for that subcarrier that involves a lower number of bits (e.g., BPSK). This is known as adaptive bit loading. If adaptive bit loading is being used, the bit interleaver 12 may be updated with the new modulation scenario each time changes are made within the plurality of digital modulators 14.

With reference to FIG. 1, the bit interleaver 12 may receive an encoded bit stream at an input thereof. The encoded bit stream may be encoded with, for example, a sliding memory encoder (e.g., a convolutional encoder, etc.) or some other type of encoder. The bit interleaver 12 is operative for interleaving the bits of the encoded bit stream among the various modulators in the plurality of digital modulators 14. Because the modulators use different modulation schemes, different numbers of bits must be distributed to different modulators.

For example, a BPSK modulator will map one input bit to a corresponding BPSK modulation symbol, a 4-QAM modulator will map two input bits to a corresponding 4-QAM modulation symbol, a 16-QAM modulator will map four input bits to a corresponding 16-QAM modulation symbol, a 64-QAM modulator will map six input bits to a corresponding 64-QAM modulation symbol, and so on. Many other digital modulation schemes may also (or alternatively) be used.

In at least one embodiment of the present invention, the bit interleaver 12 distributes the bits of the input bit stream in a manner that ensures that the bits assigned to each modulation symbol are separated by a fixed minimum separation. During the bit interleaving process, a fixed separation D is developed and is used to assign bits from the bit stream to the individual symbols. Thus, if D=3, then every third bit in the input bit stream, starting at a particular point in the stream, will be assigned to a corresponding symbol. In one approach, the upper limit of the separation value D is related to the ratio of the total number of bits within the input stream and the number of bits within the largest symbol to be modulated (e.g., $D_{max}=\text{floor}(B/b_m)$, where B is the total number of bits in the input stream and $b_m$ is the number of bits associated with the largest symbol).

Figure 2:
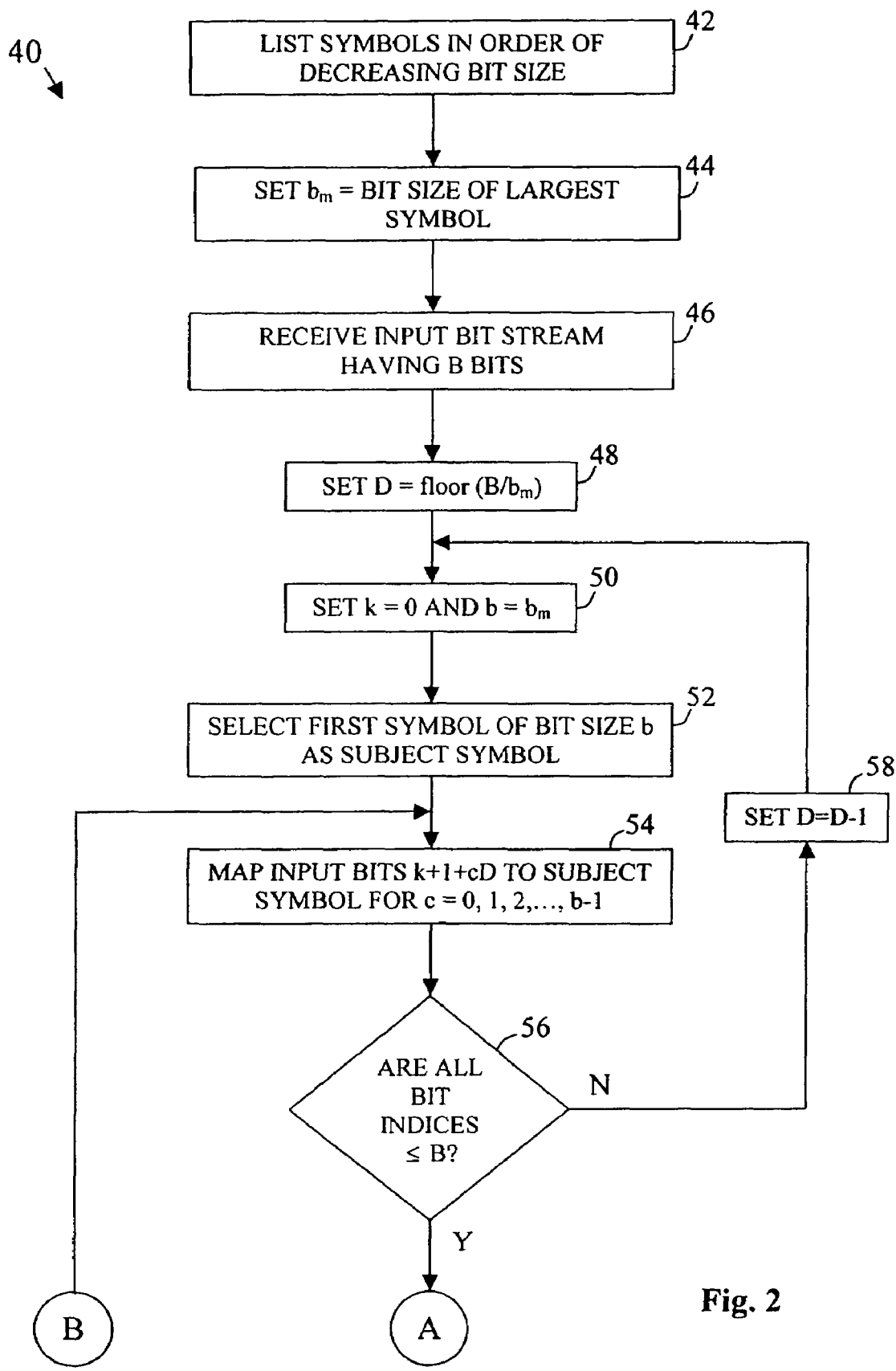
FIGS. 2 and 3 are portions of a flowchart illustrating an example method for performing bit interleaving across different modulation schemes in accordance with an embodiment of the present invention.
Figure 3:
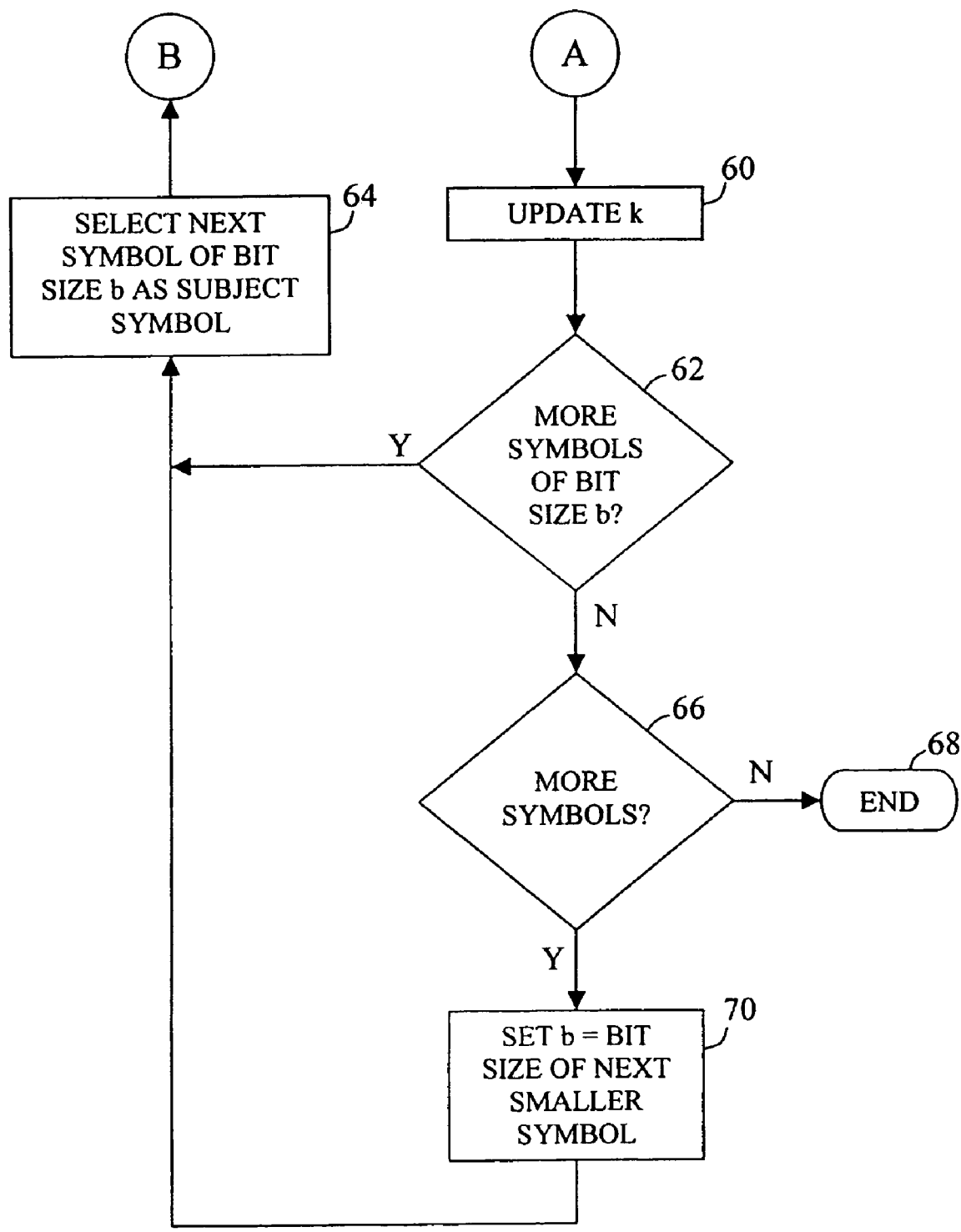

FIGS. 2 and 3 are portions of a flowchart illustrating an example method 40 for performing bit interleaving across different modulation symbols in accordance with an embodiment of the present invention. In the discussion that follows, a specific example of the operation of the method 40 will be given after a general description of the method 40 is made. The method 40 assumes that a number of modulation schemes have been pre-selected to receive varying numbers of input bits for use in generating modulation symbols for a corresponding application. As described above, one possible application is within an OFDM transmitter (or other multicarrier transmitter) using adaptive bit loading. Other application also exist. First, the various symbols that are to receive the interleaved bits are listed in order of decreasing bit size (block 42). A constant $b_m$ may then be set to the bit size of the largest symbol (block 44). For example, if the largest symbol is a 64-QAM symbol, then $b_m$ will be set to 6, and so on. At some time, an encoded input bit stream having B bits is received (block 46). These are the data bits to be interleaved. A provisional bit separation value D is next calculated as:

$$D=\text{floor }(B/b_m)$$

where floor (x) returns the highest integer that is less than or equal to x (block 48). This value of D represents the maximum value that the bit separation may assume during the interleaving process. As will be described in greater detail, the value of D may be reduced during the interleaving process under certain conditions.

A variable k is next initialized to zero and a variable b is initialized to $b_m$ (block 50). As will be described in greater detail, the variable k is a parameter that is used to track a point within the input bit string where a first unmapped bit resides. The variable b is representative of the number of bits within a symbol that is currently being processed. The symbol that is currently being processed will be referred to herein as the "subject" symbol. The first symbol in the list generated in block 42, which has a bit size of $b_m$, is now selected as the subject symbol (block 52). Input bits having indices of k+1+cD (where c=0, 1, 2, ..., b−1) are then mapped into the successive bit positions of the subject symbol (block 54). It is next determined whether the bit indices that were mapped into the subject symbol in block 54 are all less than or equal to B, the total number of bits in the input stream (block 56). If not, then the bit separation value D is too large. Thus, the bit separation value D is reduced by one (block 58) and the method returns to block 50 where k and B are again initialized. This process may be repeated until all of the bit indices mapped into the subject symbol are less than or equal to B.

When all of the bit indices mapped into the subject symbol are less than or equal to B (block 56-Y), the variable k may next be updated (block 60). In one possible approach, the new value of k may be determined by first determining which of the bits in the input bit stream have already been mapped into corresponding symbols. The variable k is then set equal to the index of the earliest bit not yet mapped, minus 1. It is next determined whether there are more symbols of bit size b within the list that have not yet been processed (block 62). If so, the next symbol of bit size b is selected as the subject symbol (block 64). The method 40 then returns to block 54 and input bits are mapped to the new subject symbol using the new value of k. If there are no more symbols of bit size b within the list (block 62-N), then it is determined whether there are any more symbols within the list, of any size (block 66). If there are no more symbols within the list (block 66-N), the method 40 ends (block 68). If there are more symbols (block 66-Y), then the variable b is set to the bit size of the next smaller symbol in the list (block 70). The method 40 may then proceed to block 64 where a next symbol having bit size b is selected from the list as the subject symbol (although now the new value for b is used). The above described method 40 may be allowed to continue until there are no more symbols left to process.

An example of the operation of the above-described method will now be described. Suppose a decision is made that the 29 convolutionally encoded bits within an input bit stream are to be interleaved across 9 symbols: two 64-QAM symbols, three 16-QAM symbols, one 4-QAM symbol, and three BPSK symbols. This is the scenario that is illustrated in FIG. 1, for example. As described previously, the bit lengths of the various symbols are as follows:

| 64-QAM | 6 bits |
| 16-QAM | 4 bits |
| 4-QAM  | 2 bits |
| BPSK   | 1 bit  |

Thus, a list of the symbols in bit size order may be generated as follows:

| Bit Size | Modulation |
|---|---|
| 6 | 64-QAM |
| 6 | 64-QAM |
| 4 | 16-QAM |
| 4 | 16-QAM |
| 4 | 16-QAM |
| 2 | 4-QAM |
| 1 | BPSK |
| 1 | BPSK |
| 1 | BPSK |

The variable $b_m$ is set to 6, the bit size of the largest symbol. The value of B is 29. The provisional bit separation value D is calculated as:

$$D=\text{floor}(B/b_m)=\text{floor}(29/6)=4$$

The value of k is initialized to zero and the value of b is initialized to 6. The first 64-QAM symbol in the list is now selected as the subject symbol. The input bits are mapped to the 6 bit positions of the subject symbol as follows:

| 1 | 5 | 9 | 13 | 17 | 21 |
|---|---|---|----|----|----|

All of these bit indices are less than or equal to 29. The variable k is now increased to k=1. There are more symbols of bit size 6 in the list that have not been processed, so the next 64-QAM symbol in the list is selected as the subject symbol. The input bits are mapped to the 6 bit positions of the new subject symbol as follows:

| 2 | 6 | 10 | 14 | 18 | 22 |
|---|---|----|----|----|----|

All of these bit indices are less than or equal to 29. The variable k is now increased to k=2. There are no additional symbols of bit size 6 in the list, but there are other symbols. The variable b is now set to the bit size of the next smaller symbol (b=4). The next symbol in the list of bit size 4 (i.e., the first 16-QAM symbol) is now selected as the subject symbol. The input bits are mapped to the 4 bit positions of the new subject symbol as follows:

| 3 | 7 | 11 | 15 |
|---|---|----|----|

All of these bit indices are less than or equal to 29. The variable k is now increased to k=3. There are additional symbols of bit size 4 in the list, so the next 16-QAM symbol in the list is selected as the subject symbol. The input bits are mapped to the 4 bit positions of the new subject symbol as follows:

| 4 | 8 | 12 | 16 |
|---|---|----|----|

All of these bit indices are less than or equal to 29. The variable k is now increased to k=18 because the earliest input bit not yet mapped is 19. There are more symbols of bit size 4 in the list, so the next (and last) 16-QAM symbol in the list is selected as the subject symbol. The input bits are mapped to the 4 bit positions of the new subject symbol as follows:

| 19 | 23 | 27 | 31 |
|----|----|----|----|

These bit indices are not all less than or equal to 29. Therefore, the bit separation value D is reduced by 1 to D=3 and the method is started over.

The value of k is once again initialized to zero and the value of b is initialized to 6. The first 64-QAM symbol is selected as the subject symbol. The input bits are mapped to the 6 bit positions of the subject symbol as follows:

| 1 | 4 | 7 | 10 | 13 | 16 |
|---|---|---|----|----|----|

All of these bit indices are less than or equal to 29. The variable k is now increased to k=1. There are additional symbols of bit size 6 in the list, so the next 64-QAM symbol in the list is selected as the subject symbol. The input bits are mapped to the 6 bit positions of the new subject symbol as follows:

| 2 | 5 | 8 | 11 | 14 | 17 |
|---|---|---|----|----|----|

All of these bit indices are less than or equal to 29. The variable k is now increased to k=2. There are no additional symbols of bit size 6 in the list, but there are other symbols. The variable b is now set to the bit size of the next smaller symbol (b=4). The next symbol in the list of bit size 4 (i.e., the first 16-QAM symbol) is now selected as the subject symbol. The input bits are mapped to the 4 bit positions of the new subject symbol as follows:

| 3 | 6 | 9 | 12 |
|---|---|---|----|

All of these bit indices are less than or equal to 29. The variable k is now increased to k=14 because the earliest input bit not yet mapped is 15. There are more symbols of bit size 4 in the list, so the next 16-QAM symbol in the list is selected as the subject symbol. The input bits are mapped to the 4 bit positions of the new subject symbol as follows:

| 15 | 18 | 21 | 24 |
|----|----|----|----|

All of these bit indices are less than or equal to 29. The variable k is now increased to k=18 because the earliest input bit not yet mapped is 19. There are more symbols of bit size 4 in the list, so the next (and last) 16-QAM symbol in the list is selected as the subject symbol. The input bits are mapped to the 4 bit positions of the new subject symbol as follows:

| 19 | 22 | 25 | 28 |
|----|----|----|----|

All of these bit indices are less than or equal to 29. The variable k is now increased to k=19 because the earliest input bit not yet mapped is 20. There are no additional symbols of bit size 4 in the list, but there are other symbols. The variable b is now set to the bit size of the next smaller symbol (b=2). The next symbol in the list of bit size 2 (i.e., the first and only 4-QAM symbol) is now selected as the subject symbol. The input bits are mapped to the 2 bit positions of the new subject symbol as follows:

| 20 | 23 |
|----|----|

All of these bit indices are less than or equal to 29. The variable k is now increased to k=25 because the earliest input bit not yet mapped is 26. There are no additional symbols of bit size 2 in the list, but there are other symbols. The variable b is now set to the bit size of the next smaller symbol (b=1). The next symbol in the list of bit size 1 (i.e., the first BPSK symbol) is now selected as the subject symbol. The input bits are mapped to the 1 bit position of the new subject symbol as follows:

| 26 |
|----|

This bit index is less than or equal to 29. The variable k is now increased to k=26 because the earliest input bit not yet mapped is 27. There are more symbols of bit size 1 in the list, so the next BPSK symbol in the list is selected as the subject symbol. The input bits are mapped to the 1 bit position of the new subject symbol as follows:

| 27 |
|----|

This bit index is less than or equal to 29. The variable k is now increased to k=28 because the earliest input bit not yet mapped is 29. There is one more symbol of bit size 1 in the list, so the next BPSK symbol in the list is selected as the subject symbol. The input bits are mapped to the 1 bit position of the new subject symbol as follows:

| 29 |
|----|

This bit index is less than or equal to 29. There are no more symbols of bit size 1. Likewise, there are no more symbols of any size. Thus, the method ends. As shown above, all of the bits within the input bit stream have been successfully interleaved among the available symbols. In addition, each of the bits assigned to a particular symbol are separated from one another by a minimum bit separation D. As is apparent from the above example, if the initial bit separation value D that is calculated during the interleaving process is too high, the method may automatically lower the value to an acceptable level.

In at least one embodiment of the present invention, additional intra-QAM interleaving may be performed after the above interleaving techniques have been performed. For example, in one approach, after the input bits have been interleaved among the symbols, some of the assigned bits within a symbol may be rotated from least significant bit (LSB) positions to most significant bit (MSB) positions, and vice versa. For instance, in the example set out above, the first and second 64-QAM symbols were assigned bits as follows:

| 1 | 4 | 7 | 10 | 13 | 16 |
|---|---|---|----|----|----|
| 2 | 5 | 8 | 11 | 14 | 17 |

After intra-QAM interleaving, the assigned bits may change as follows:

| 1  | 4  | 7  | 10 | 13 | 16 |
|----|----|----|----|----|----|
| 11 | 14 | 17 | 2  | 5  | 8  | where the 3 LSBs in the second 64-QAM symbol become the 3 MSBs of the symbol, and vice versa. Similarly, the first, second, and third 16-QAM symbols were assigned bits as follows in the example:

| 3  | 6  | 9  | 12 |
|----|----|----|----|
| 15 | 18 | 21 | 24 |
| 19 | 22 | 25 | 28 |

After intra-QAM interleaving, the assigned bits may change as follows:

| 3  | 6  | 9  | 12 |
|----|----|----|----|
| 21 | 24 | 15 | 18 |
| 19 | 22 | 25 | 28 | where the 2 LSBs in the second 16-QAM symbol become the 2 MSBs of the symbol, and vice versa. Note that the rotation may be limited to every other symbol of a particular bit size in at least one embodiment. The above-described intra-QAM rotations may be performed, for example, to prevent a situation where two adjacent symbols (associated with, for example, two adjacent sub-carriers) have adjacent bits from the input bit stream in the same bit position. For example, in the 64-QAM scenario above, before intra-QAM interleaving, bit 1 from the input bit string is in the first position of the first 64-QAM symbol and bit 2 from the input bit string is in the first position of the second 64-QAM symbol. If these two symbols are transmitted in adjacent subcarriers, problems might arise from this bit proximity. After intra-QAM interleaving, however, bit 11 from the input bit string is in the first position of the second 64-QAM symbol and the potential problem is avoided.

As described above, in at least one embodiment, features of the invention may be implemented within OFDM-based systems that use adaptive bit loading. In such a system, the inventive bit interleaving procedures may be repeated each time there is a change in the modulation schemes being used for the various sub-carriers of the system. In at least one implementation, the modulation schemes may change for each OFDM symbol generated, thus the inventive interleaving may also be repeated for every OFDM symbol generated. The inventive interleaving techniques and structures may also be used in other applications, including non-OFDM applications. In one application, features of the invention may be used to multiplex bits across unequal spatial streams. That is, bit interleaving may be performed across unequal length spatial or spectral streams by treating the streams as heterogeneous symbol sizes. Features of the invention may also be used within multiple input, multiple output (MIMO) based systems. For example, in a multiple transmit antenna MIMO transmitter that also uses OFDM, the transmitter arrangement 10 of FIG. 1 may be repeated for each of the corresponding transmit antennas. Other applications also exist.

Bits that are interleaved as described above will eventually need to be de-interleaved. This de-interleaving may be performed in a variety of different ways. In one approach, for example, the de-interleaver will acquire knowledge of the unequal QAM assignments to the subcarriers (tones) or spatial streams. The de-interleaver may then perform the interleaving process to determine how the bits were interleaved. Once it is known how the bits were interleaved, the de-interleaver may simply reverse the process after mapping the received symbols to bits. In another approach, the interleaver may create a table (or other data structure) that contains the mapping of the input bits to the output locations. The table may then be communicated to the de-interleaver through a direct or indirect channel. Other de-interleaving techniques may alternatively be used.

The techniques and structures of the present invention may be used in a wide variety of different forms. For example, features of the invention may be embodied within cellular telephones and other handheld wireless communicators; personal digital assistants having wireless capability; laptop, palmtop, and tablet computers having wireless capability; pagers; satellite communicators; cameras having wireless capability; audio/video devices having wireless capability; network interface cards (NICs) and other network interface structures; conmunication devices for use in wired communication systems; integrated circuits; as instructions and/or data structures stored on machine readable media; and/or in other formats. Examples of different types of machine readable media that may be used include floppy diskettes, hard disks, optical disks, compact disc read only memories (CD-ROMs), magneto-optical disks, read only memories (ROMs), random access memories (RAMs), erasable programmable ROMs (EPROMs), electrically erasable programmable ROMs (BEPROMs), magnetic or optical cards, flash memory, and/or other types of media suitable for storing electronic instructions or data.

It should be appreciated that the individual blocks illustrated in the block diagrams herein may be functional in nature and do not necessarily correspond to discrete hardware elements. For example, in at least one embodiment, two or more of the blocks in a block diagram may be implemented within a common digital processing device. The digital processing device may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
   obtaining information about a group of symbols, said information including a bit size for each symbol in said group;
   acquiring an encoded bit stream having B bits, said B bits being indexed from 1 to B; and
   interleaving said bits of said encoded bit stream across said group of symbols, wherein interleaving includes:
   determining a bit separation value D;
   assigning first bits from said encoded bit stream to bit positions associated with a first symbol in said group of symbols, said first bits starting at index 1 and having indices that are separated from one another by D; and
   reducing said bit separation value D and reinitiating interleaving when it is determined that said bit separation value D is too large, wherein said bit separation value D is too large when said indices associated with said first bits include an index greater than B.

2. The method of claim 1, wherein:
   interleaving further includes:
   assigning second bits from said encoded bit stream to bit positions associated with a second symbol in said group of symbols, said second bits starting at index 2 and having indices that are separated from one another by D; and
   reducing said bit separation value D and reinitiating interleaving when it is determined that said bit separation value D is too large, wherein said bit separation value D is too large when said indices associated with said second bits include an index greater than B.

3. The method of claim 2, wherein:
   interleaving further includes:
   assigning bits from said encoded bit stream to bit positions associated with other symbols within said group of symbols, one symbol at a time, said other symbols including all symbols in said group of symbols other than said first and second symbols, said bits assigned to each of said other symbols starting at a lowest unassigned index and having indices that are separated from one another by D; and
   reducing said bit separation value D and reinitiating interleaving when it is determined that said bit separation value D is too large, wherein said bit separation value D is too large when said indices associated with the assigned bits of any of said other symbols include an index greater than B.

4. The method of claim 3, wherein:
   assigning first bits to bit positions associated with said first symbol is performed before assigning second bits to bit positions associated with said second symbol and assigning bits to bit positions associated with other symbols, wherein said first symbol has a largest bit size of said group of symbols.

5. The method of claim 1, wherein:
   said group of symbols are arranged in bit size order, wherein said first symbol in said group of symbols has a largest bit size and a last symbol in said group of symbols has a smallest bit size.

6. The method of claim 3, wherein:
   interleaving further includes rotating at least one least significant bit within a particular symbol to a most significant bit position and at least one most significant bit within said particular symbol to a least significant bit position after bits from said encoded bit stream have been assigned to bit positions associated with said particular symbol.

7. The method of claim 1, wherein:
determining a bit separation value includes calculating a bit separation value based on the number of bits B within said encoded bit stream and a largest symbol bit size in said group of symbols.

8. The method of claim 1, wherein:
determining a bit separation value includes calculating a bit separation value as follows:

$$D=\text{floor}(B/b_m)$$

where B is the number of bits within said encoded bit stream, bm is the largest symbol bit size within said group of symbols, and floor(x) returns the largest integer that is less than or equal to x.

9. The method of claim 1, wherein:
said group of symbols are symbols associated with a number of corresponding digital modulators.

10. The method of claim 1, wherein:
said method is performed in a communication system using orthogonal frequency division multiplexing (OFDM).

11. An apparatus comprising:
an input to receive an encoded bit stream, said encoded bit stream having B bits that are indexed from 1 to B; and
a bit interleaver to interleave said bits of said encoded bit stream across multiple symbols, said multiple symbols having multiple different bit lengths, said bit interleaver to determine a bit separation value and to distribute first bits from said encoded bit stream to a first symbol of said multiple symbols, said first bits starting at index 1 and having indices that are separated from one another by said bit separation value, said bit interleaver to reduce said bit separation value while interleaving said bits of said encoded bit stream when it is determined that said bit separation value is too large, wherein said bit interleaver is to reinitiate said interleaving of said bits of said encoded bit stream after said bit separation value is reduced, wherein said bit separation value is too large when said indices associated with said first bits include an index greater than B.

12. The apparatus of claim 11, wherein:
said bit interleaver is adapted to:
distribute second bits from said encoded bit stream to a second symbol of said multiple symbols, said second bits starting at index 2 and having indices that are separated from one another by said bit separation value; and
reduce said bit separation value and reinitiate said interleaving of said bits of said encoded bit stream when it is determined that said bit separation value is too large, wherein said bit separation value is too large when said indices associated with said second bits include an index greater than B.

13. The apparatus of claim 12, wherein:
said bit interleaver is adapted to:
distribute bits from said encoded bit stream to other symbols of said multiple symbols, one symbol at a time, said other symbols being all of said multiple symbols other than said first and second symbols, said bits assigned to each of said other symbols starting at a lowest unassigned index and having indices that are separated from one another by said bit separation value; and
reduce said bit separation value and reinitiate said interleaving of said bits of said encoded bit stream when it is determined that said bit separation value is too large, wherein said bit separation value is too large when said indices associated with the distributed bits of any of said other symbols include an index greater than B.

14. The apparatus of claim 11, wherein:
said first symbol has a largest bit size of said multiple symbols.

15. The apparatus of claim 11, wherein:
said bit interleaver to determine said bit separation value based on the number of bits B within said encoded bit stream and a largest symbol bit size in said group of symbols.

16. The apparatus of claim 11, wherein:
said bit interleaver to determine said bit separation value using the following equation:

$$D=\text{floor}(B/b_m)$$

where B is the number of bits within said encoded bit stream, bm is the largest symbol bit size of said multiple symbols, and floor(x) returns the largest integer that is less than or equal to x.

17. The apparatus of claim 11, wherein:
said bit interleaver to rotate at least one least significant bit within a particular symbol to a most significant bit position and at least one most significant bit within said particular symbol to a least significant bit position after bits from said encoded bit stream have been distributed to said particular symbol.

18. An apparatus comprising:
an input to receive an encoded bit stream, said encoded bit stream having B bits that are indexed from 1 to B;
a bit interleaver to interleave said bits of said encoded bit stream across multiple symbols, said multiple symbols having multiple different bit lengths, said bit interleaver to determine a bit separation value and to distribute first bits from said encoded bit stream to a first symbol of said multiple symbols, said first bits having indices that are separated from one another by said bit separation value, said bit interleaver to reduce said bit separation value while interleaving said bits of said encoded bit stream when it is determined that said bit separation value is too large, wherein said bit interleaver to reinitiate said interleaving after said bit separation value is reduced; and
at least one dipole antenna to transmit said multiple symbols.

19. The apparatus of claim 18, further comprising:
a plurality of digital modulators between said bit interleaver and said at least one dipole antenna to receive and process said multiple symbols; and
an inverse discrete Fourier transform (IDFT) unit to receive outputs of said plurality of digital modulators and to convert said outputs from a frequency domain representation to a time domain representation before transmission.

20. The apparatus of claim 19, further comprising:
a cyclic prefix unit, located between said IDFT unit and said at least one dipole antenna, to add a cyclic prefix to said time domain representation to form an orthogonal frequency division multiplexing (OFDM) symbol.

21. The apparatus of claim 19, wherein:
each modulator in said plurality of digital modulators has a modulation scheme that can change with time.

22. The apparatus of claim 18, wherein:
said bit interleaver to distribute second bits from said encoded bit stream to a second symbol of said multiple symbols, said second bits having indices that are separated from one another by said bit separation value, wherein said second bits are different from said first bits.

23. The apparatus of claim 22, wherein:
said bit interleaver to distribute bits from said encoded bit stream to other symbols of said multiple symbols, said other symbols being all of said multiple symbols other than said first and second symbols, said bits assigned to each of said other symbols having indices that are separated from one another by said bit separation value.

24. An article comprising a computer readable storage medium having instructions stored thereon that, when executed by a computing platform, operate to:
   obtain information about a group of symbols, said information including a bit size for each symbol in said group;
   acquire an encoded bit stream having B bits, said B bits being indexed from 1 to B; and
   interleave said bits of said encoded bit stream across said group of symbols; wherein said interleave operation includes operation to:
      determine a bit separation value D;
      assign first bits from said encoded bit stream to bit positions associated with a first symbol in said group of symbols, said first bits starting at index 1 and having indices that are separated from one another by D; and
      reduce said bit separation value D and reinitiate said interleave operation during interleaving when it is determined that said bit separation value D is too large, wherein said bit separation value D is too large when said indices associated with said first bits include an index greater than B.

25. The article of claim 24, wherein:
said interleave operation further includes operation to:
   assign second bits from said encoded bit stream to bit positions associated with a second symbol in said group of symbols, said second bits starting at index 2 and having indices that are separated from one another by D; and
   reduce said bit separation value D and reinitiate said interleave operation when it is determined that said bit separation value D is too large, wherein said bit separation value D is too large when said indices associated with said second bits include an index greater than B.

26. The article of claim 25, wherein:
said interleave operation further includes operation to:
   assign bits from said encoded bit stream to bit positions associated with other symbols within said group of symbols, one symbol at a time, said other symbols including all symbols in said group of symbols other than said first and second symbols, said bits assigned to each of said other symbols starting at a lowest unassigned index and having indices that are separated from one another by; and
   reduce said bit separation value D and reinitiate said interleave operation when it is determined that said bit separation value D is too large, wherein said bit separation value D is too large when said indices associated with the assigned bits of any of said other symbols include an index greater than B.

* * * * *

UNITED STATES PATENT AND TRADEMARK OFFICE
CERTIFICATE OF CORRECTION

PATENT NO. : 7,539,270 B2  Page 1 of 1
APPLICATION NO. : 10/954618
DATED : May 26, 2009
INVENTOR(S) : Sumeet Sandhu It is certified that error appears in the above-identified patent and that said Letters Patent is hereby corrected as shown below:

In column 11, line 16, in Claim 8, delete "bm" and insert -- $b_m$ --, therefor.

In column 12, line 22, in Claim 16, delete "bm" and insert -- $b_m$ --, therefor.

In column 14, line 25, in Claim 26, delete "by; and" and insert -- by D; and --, therefor.

Signed and Sealed this

First Day of September, 2009

David J. Kappos
*Director of the United States Patent and Trademark Office*